United States Patent [19]

Mc Grane

[11] Patent Number: 5,442,140
[45] Date of Patent: Aug. 15, 1995

[54] CONDUIT AND CABLE SEALER

[75] Inventor: Eugene W. Mc Grane, Ormond Beach, Fla.

[73] Assignee: Homac Mfg. Company, N.J.

[21] Appl. No.: 131,548

[22] Filed: Oct. 5, 1993

[51] Int. Cl.⁶ ............................................. H02G 3/22
[52] U.S. Cl. ..................................... 174/151; 174/93
[58] Field of Search ............... 174/151, 65 G, 138 F, 174/152 G, 153 G, 82, 65 R, 77 R, 74 A, 93

[56] References Cited

U.S. PATENT DOCUMENTS

| | | | |
|---|---|---|---|
| 1,778,714 | 10/1930 | Cafiero | 174/82 |
| 2,978,533 | 4/1961 | Colbert | 174/93 |
| 3,254,153 | 5/1966 | Kohler | 174/93 |
| 3,260,794 | 7/1966 | Kohler | 174/138 |
| 3,518,358 | 6/1970 | Brown | 174/138 |
| 4,015,072 | 3/1977 | Gillemot | 174/92 |
| 4,079,193 | 3/1978 | Channell | 174/138 F |
| 4,232,184 | 11/1980 | Faust | 174/92 |
| 4,486,620 | 12/1984 | Ball et al. | 174/41 |
| 4,857,672 | 8/1989 | Rebers et al. | 174/93 |
| 4,994,630 | 2/1991 | Schilling | 174/41 |
| 5,158,479 | 10/1992 | Mouissie | 174/152 G X |
| 5,170,017 | 12/1992 | Stanevich et al. | 174/153 G |
| 5,208,428 | 5/1993 | Foss | 174/77 R X |

FOREIGN PATENT DOCUMENTS 2557330  7/1977  Germany .

Primary Examiner—Kristine L. Kincaid
Assistant Examiner—D. A. Tone
Attorney, Agent, or Firm—John E. Benoit

[57] ABSTRACT

A conduit and cable sealer comprising a resilient cylindrical base terminating in opposed end faces with a circumferential flange extending transversely from one of the faces. A plurality of boreholes extend through the base between the two faces. Cable-accepting seals having stepped towers are insertable in and removable from the boreholes and provide a frictional fit with the internal walls of the boreholes. The base with cable-accepting seals inserted frictionally fits within an end of a conduit so as to seal that end of the conduit when not in use. When cables are used, the towers are cut to the proper size so as to frictionally fit about the cables.

3 Claims, 2 Drawing Sheets

CONDUIT AND CABLE SEALER

This application relates to conduit and cable sealers and particularly to conduit and cable sealers for use in underground vaults.

For underground distribution systems, when the basic vault installation is first placed underground, conduits extend through the walls of the vault and usually terminate flush with the inner surface of the walls. The vault may remain in this condition for a relatively long period of time before the actual cables are fed into the vaults for the necessary electrical distribution procedures.

One of the problems which exists due to the above-discussed construction is that debris, dirt, insects, and animal life can easily enter the conduits and foul the interior of the vaults before final installation is completed. Thus, the vault must be cleaned prior to actual use, sometimes requiring many man hours and reducing the economy of the construction.

The present invention provides a relatively simple means for sealing the conduit at its junction point with the wall of the vault before cables are installed and, using the same apparatus, sealing the conduit and the cables which are passed through the conduit so as to have a watertight seal construction within the vault when the project is finished.

The objects of the invention will become obvious from the following description taken together with the drawings.

SUMMARY OF THE INVENTION

A conduit and cable sealer is provided which comprises a substantially cylindrical base formed from a resilient moldable material. The base terminates in opposed end faces with a circumferential flange extending transversely from one of the faces. A plurality of boreholes extend through the base between the end faces and resilient cable-accepting seals having stepped towers are insertable in and removable from the boreholes. These cable-accepting seals provide a friction fit when inserted into the boreholes. The cylindrical base is adapted to frictionally fit within and be removable from an open end of a conduit terminating in a vault wall whereby when it is inserted into the conduit the flange abuts against the inner surface of the vault wall. Since the uncut cable-accepting seals provide a friction fit within the boreholes, the conduit is effectively sealed. When the cables are passed through the conduit the towers of the cable-accepting seals are cut to the desired section so as to provide a seal about the cables, and the base is inserted back into the conduit so that a watertight seal exists after the installation is complete.

DETAILED DESCRIPTION OF THE PREFERRED EMBODIMENT

Figure 1:
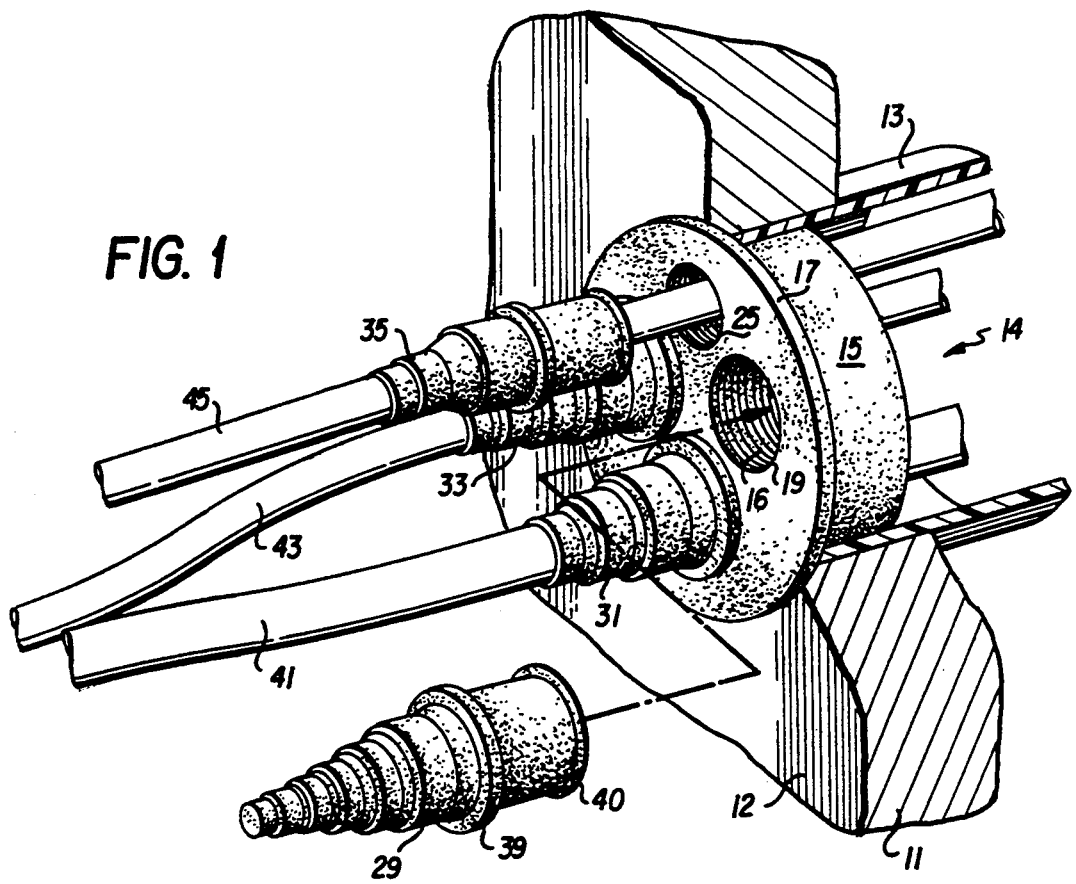
FIG. 1 is a perspective view of the seal of the present invention in place within a conduit in a vault wall.
Figure 2:
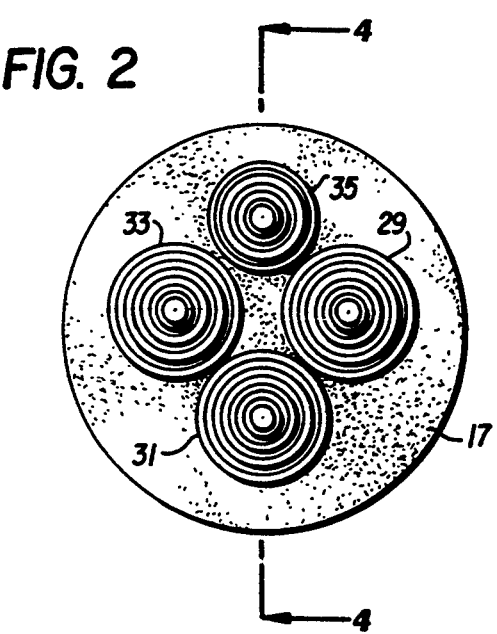
FIG. 2 is a view of one end of the conduit with the towers in place.

Referring now to the drawings, and particularly to FIG. 1, there is shown a cutaway section of wall 11 of an underground vault with conduit 13 being secured within wall 11 and terminating flush with the inner side 12 of wall 11. Conduit and cable sealer 14 comprises a substantially resilient cylindrical base 15 terminating in opposed end faces. Circumferential flange 17 extends transversely from one of the faces so that when sealer 14 is in place as shown in FIG. 1, flange 17 abuts inner side 12 of vault wall 11.

A plurality of boreholes 19, 21, 23, and 25 extend through base 15 between the two end walls. Each of the boreholes includes a plurality of rings 16 which improve the sealing desired when the components are assembled.

Cable-accepting seals 29, 31, 33, and 35, including a tower-type structure, are insertable in and removable from their associated boreholes, as indicated in FIG. 1. When the cable-accepting seals are in place in the boreholes they provide a friction fit between the seals and the boreholes. This is further enhanced by including flanges 39 and 40, which are separated by a distance equivalent to the length of base 15 so as to lock the seals in place. When the cables are passed through the seals, the appropriately cut towers provide a friction fit about the cables.

Figure 3:
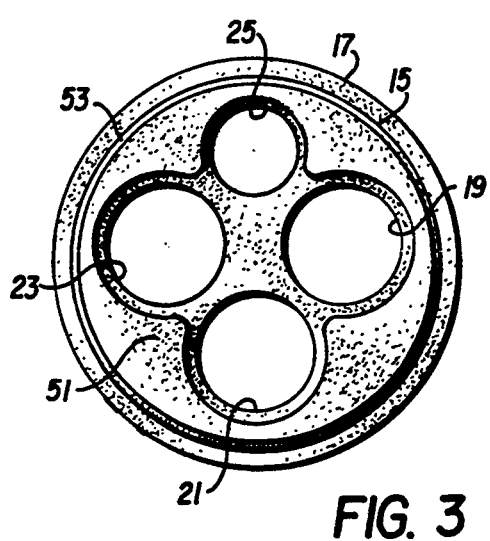
FIG. 3 is a view of the other end of the conduit with the towers removed.
Figure 4:
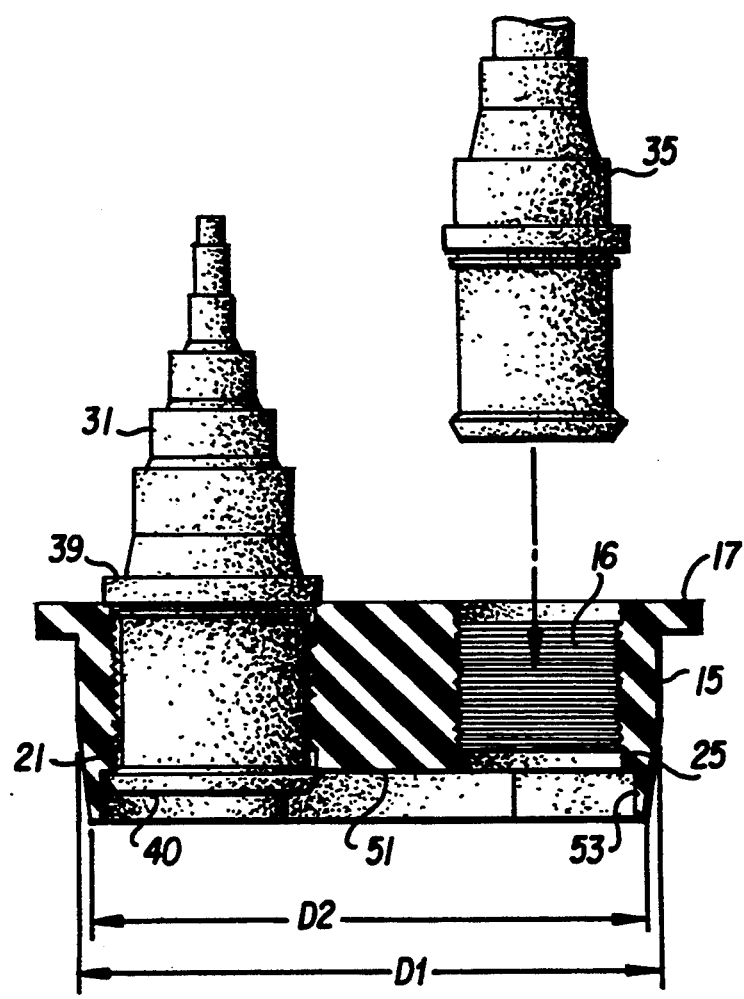
FIG. 4 is a sectional view taken along the lines 4—4 of FIG. 2.

As shown more clearly in FIGS. 3 and 4, one of the faces 51 of base 15 is recessed so as to provide circumferential wall 53 extending axially from along the outer perimeter of that end of the base.

With base 15 and the cable-accepting seals in place with the towers of the seals uncut, the end of conduit 13 is effectively sealed so that no debris, dirt, animal, or insect can enter the vault through the conduit.

When the insulated cables are to be fed through the conduit, cylindrical base 15 is removed from the end of the conduit and the cable-accepting seals are removed from their respective boreholes. Base 15 is loosely passed over the respective cables which extend through the boreholes and is then secured within conduit 13. The ends of the towers are cut to the desired dimension and the cable-accepting seal is passed over the ends of the particular insulated cables 41, 43, and 45 so as to provide a watertight seal about the cable. The cable-accepting seals are then passed along the cable and re-inserted into their respective boreholes. FIG. 1 shows a partially completed installation for cables 41 and 43. Cable 45 is shown with seal 35 before it is inserted into borehole 25.

Referring to FIG. 4, it can be seen that a portion of the outer surface of cylindrical base 15 is tapered inwardly so that the distal diameter D2 is less than diameter D1 of cylindrical base 15 adjacent flange 17. This taper in cooperation with the thinner wall 53 provides a guide for easier insertion of the base into the end of the conduit.

As now will be evident, a conduit cable sealer is provided which not only seals the end of an empty conduit while awaiting completion of installation, but also provides a seal after the installation is completed.

The above description and drawings are illustrative only since modifications could be made to the disclosed embodiment without departing from the invention, the scope of which is to be limited only by the following claims.

What is claimed is:

1. A conduit and cable sealer comprising
a substantially cylindrical base having opposed end faces, said end faces being formed from a resilient moldable material;
a circumferential flange extending transversely outwardly of one of said faces of said cylindrical base;
the outer surface of said cylindrical base being tapered inwardly at the other of said end faces;
a plurality of boreholes extending through said base between said end faces;
resilient cable-accepting seals having stepped towers insertable in and removable from said boreholes and providing a friction fit when inserted into said boreholes;
the outside surface of said cylindrical base having a substantially constant diameter between said circumferential flange and said taper at said other end;
whereby said cylindrical base is adapted to frictionally fit within and be removable from an open end of a conduit so as to seal said conduit.

2. The conduit and cable sealer of claim 1 wherein the portion of the other of said end faces containing said boreholes is recessed so as to provide a reduced wall section about said portion.

3. The conduit and cable sealer of claim 1 wherein said stepped towers have a portion thereof removed and further comprising
insulated cables passing through said towers and functionally engaging the inside surfaces of said towers.

* * * * *